United States Patent [19]

Norris et al.

[11] 4,226,365

[45] Oct. 7, 1980

[54] FUEL DISTRIBUTION VALVE FOR A GAS TURBINE ENGINE

[75] Inventors: James R. Norris, Bolton; Guy W. Miller; John C. Jamison, both of Vernon, all of Conn.; Ralph D. Ransom, San Clemente, Calif.

[73] Assignee: United Technologies Corporation, Hartford, Conn.

[21] Appl. No.: 52,635

[22] Filed: Jun. 27, 1979

[51] Int. Cl.³ ............................................. A01G 25/02
[52] U.S. Cl. ...................................... 239/66; 137/118; 239/551; 239/570
[58] Field of Search .................. 239/550, 551, 570, 66, 239/533.9, 533.2; 137/118, 119

[56] References Cited

U.S. PATENT DOCUMENTS

| | | | |
|---|---|---|---|
| 2,664,910 | 1/1954 | Boyd | 137/118 |
| 2,700,394 | 1/1955 | Jay | 137/118 |

Primary Examiner—Richard A. Schacher
Attorney, Agent, or Firm—Norman Friedland

[57] ABSTRACT

A valve having a translatable annular slot communicates with discretely shaped and judiciously located elongated, variable width slots for metering fuel to individual fuel nozzles in a burner of a jet engine without changing the fuel scheduling characteristics of the fuel control. The valve can have sequential lighting capabilities in the event that the burner is designed with this feature.

6 Claims, 3 Drawing Figures

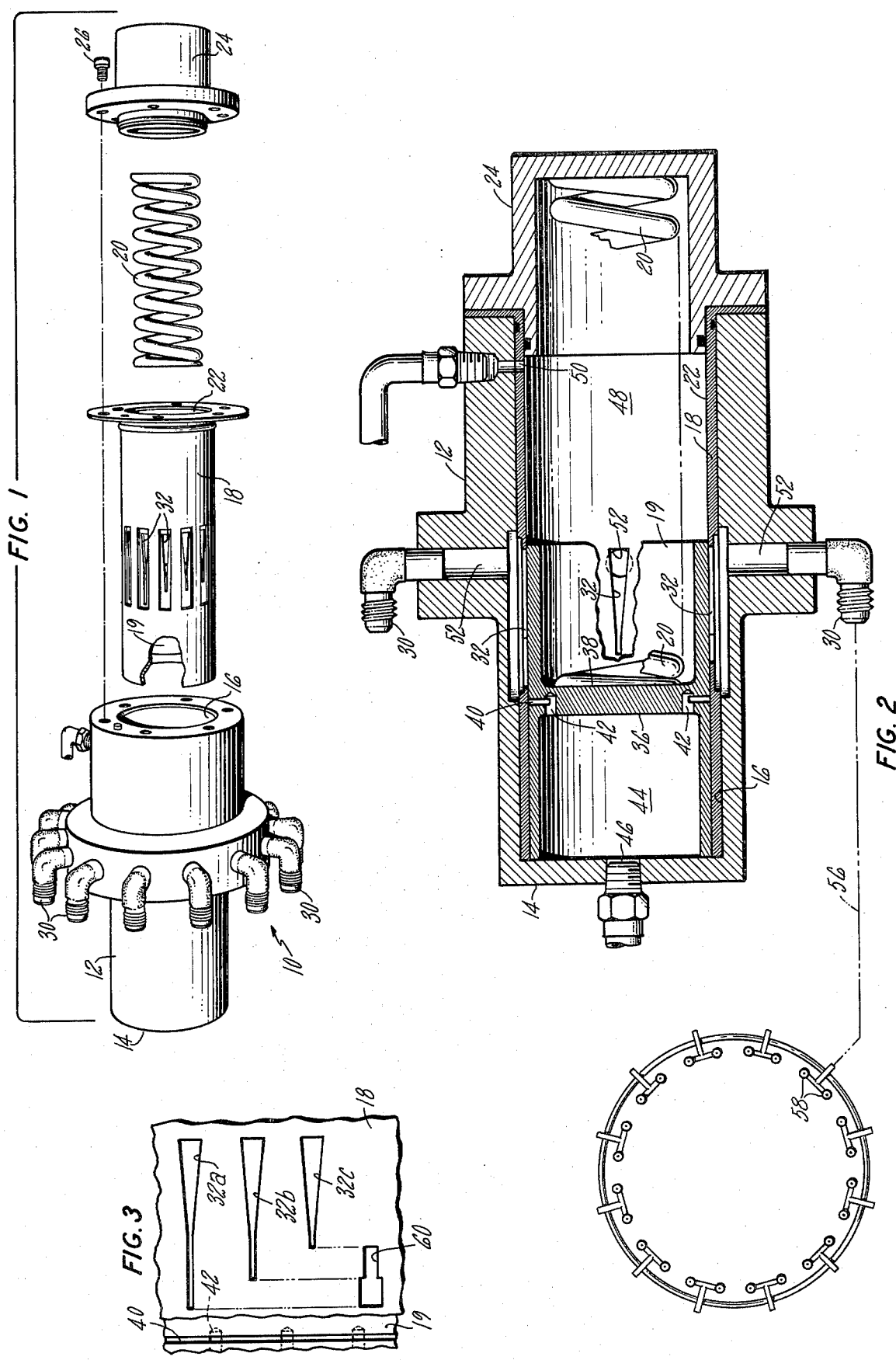

FUEL DISTRIBUTION VALVE FOR A GAS TURBINE ENGINE

BACKGROUND OF THE INVENTION

This invention relates to fuel systems for a gas turbine engine and more particularly to a fuel divider valve that can also be employed for sequential start-up of the engine.

As is well known, to obtain ignition in a jet engine the fuel/air ratio must be maintained above some minimum value in the vicinity of the nozzles where lighting is to occur. Normally ignition is started in one or two places and the flame rapidly propogates all around the burner. In some engines this rapid addition of energy will drive the compressor into stall unless massive compressor bleed provisions are made. This stall condition may be alleviated by sequentially lighting, at a controlled rate, selected areas at the correct local fuel/air ratio in the burner so that engine acceleration to idle can be accomplished at a rate that will not drive the compressor into stall. To this end this invention teaches a fuel divider valve for a single stage burner which will provide metering to individual fuel nozzles and sequential lighting capability without changing the fuel scheduling characteristics of the fuel control. Because of the uniqueness of this valve it lends itself to being used as a flow divider distributor and metering valve because of its ability to accurately proportion the flow through the discharge ports over a wide fuel flow band.

SUMMARY OF THE INVENTION

A feature of this invention is a divider valve with sequential flow delivery capabilities that has an inner slideable sleeve with an annular slot communicating internally of said valve with discharge ports formed on the outer casing for distributing fuel to a nozzle system in the burner of a turbine type power plant. A feature of this invention is that the flow accuracy between discharge ports remains relatively accurate over a wide flow band.

Other features and advantages will be apparent from the specification and claims and from the accompanying drawings which illustrate an embodiment of the invention.

BRIEF DESCRIPTION OF THE DRAWINGS

FIG. 1 is an exploded view in perspective showing the details of the invention;

FIG. 2 is a view partly in section and partly in schematic showing the valve as connected to the nozzles of the burner; and, FIG. 3 is a partial view in schematic illustrating the port configuration for sequencing operation with by-pass capabilities.

DESCRIPTION OF THE PREFERRED EMBODIMENT

As noted from FIG. 1, the flow divider generally illustrated by reference numeral 10 has an outer cylindrical case 12, closed on one end 14 and opened on the opposite end. Bore 16 is dimensioned to receive sleeve 18. Piston 19 and spring 20 fitting into bore 22 of sleeve 18 and the combination closure cap and spring retainer 24 form the remainder of the valve. The cap may be secured to the main body, i.e. the outher cylindrical case 12 by bolts 26 (one being shown) fitting through opening formed in flanges formed on the cap and sleeve to thread into complimentary opening formed on the facing end of the cylindrical case 12. A plurality of discharge fittings 30 are formed around the periphery of cylindrical case 12 and cooperates with slots 32 formed in sleeve 18 as will be explained in connection with the description of FIG. 2.

FIG. 2 shows the components assembled where sleeve 18 fits into the bore 16 of outer cylindrical case 12 and is locked into position by the flange on cap 24 and the end of the case 12. Piston 19 having fluid reaction wall surfaces 36 and 38 is slideable relative to the fixed sleeve 18. The spring 20 and pressure in the right-hand chamber act against reaction surface 38 to urge the piston in one direction and fluid admitted into the other end act against the reaction surface 36 to urge the piston in the opposite direction.

According to this invention an annular slot 40 is formed in the outer diameter of piston 19 which is fed with fuel through a plurality of drilled axial holes 42 (only two being shown) from chamber 44. Chamber 44 receives fuel from the fuel supply through the port 46.

Fuel in chamber 44 also serves to position the piston 19 rightwardly against the force created by spring 20 and the reference pressure in chamber 48 admitted therein through inlet port 50.

From the foregoing it is apparent that fuel from chamber 44 passes through axial holes 42 into annular slot 40 and into discharge ports 52 communicating with fittings 30. Also, as schematically illustrated in FIG. 2 fuel connecting lines 56 connect fuel nozzles 58 (two nozzles for each connection) with the fittings 30 for supplying fuel to the burner. Obviously, the number of nozzles could be one or more and is a design consideration and does not affect the scope of the invention. As the volume of fuel increases as metered by the fuel control (not shown) piston 19 moves rightfully such that annular slot slides over the elongated slots 32, whose width is increasing wider to deliver more flow as the engine accelerates. Obviously, as larger area of the slot is uncovered or placed in communication with annular slot 40, an increase in fuel flow will be evidenced in the associated nozzles.

FIG. 3 exemplies how the valve can be readily adapted to have sequential fuel flow capabilities. As noted, slots 32a, 32b and 32c are progressively shorter in length and are axially spaced relative to the first point contacted by annular slot 40. Hence, as piston 19 and annular slot 40 travels axially toward the right, it first contacts 32a which feeds a first nozzle or set of nozzles; then 32b which likewise feeds another nozzle and then 32c. A by-pass serves to return the fuel supplied by the fuel control that isn't being directed to the burner by the flow divider. This serves to accommodate a constant fuel supply from the fuel control so that when all the slots 32a, 32b and 32c are exposed the by-pass 60 is disconnected. The stepped starting technique, of course, can be accommodated in the fuel control itself, thus eliminating the need of the by-pass. However, it is a simpler solution to shape the sleeve ports rather than change the requisite fuel control components.

As will be appreciated, the invention, when used as a fuel divider, is particularly useful with "aerating" nozzles (low pressure drop across nozzles) in that fuel dividing and distribution is governed by the slot flow area and the spring and reference pressure force in the valve, is therefore relatively insensitive to nozzle delta pressure and the length of tube from valve to nozzle. The valve, thus, is characterized by its ability to accurately proportion the flow over a wide fuel flow band.

It should be understood that the invention is not limited to the particular embodiments shown and described herein, but that various changes and modifications may be made without departing from the spirit and scope of this novel concept as defined by the following claims.

We claim:

1. A fuel distributing valve for directing metered fuel flow from a fuel control controlling the operation of a gas turbine engine to the fuel nozzles of the burner of that gas turbine engine, said fuel distributing valve having a cylindrical casing, a sleeve affixed in a bore of said cylindrical casing having a plurality of spaced circumferential elongated slots of varying widths communicating with corresponding complimentary outlet ports in said casing communicating with said nozzles, a piston in sliding relationship with said sleeve having an annular groove, means for feeding fuel to said annular groove so that the position of said annular groove relative to said elongated slots determines the amount of fuel permitted to enter each of said nozzles.

2. A fuel distributing valve as in claim 1 wherein said piston includes opposing reaction faces, where one of said faces is subjected to a spring force and reference pressure and the other face is subjected to the metered fuel.

3. A fuel distributing valve as in claim 2 wherein said cylindrical casing is closed on one end and opened on the other end including a cap element having a flange for being mounted on said open end of said cylindrical bore, a recess in said cap for receiving one end of said spring and the opposing end of said spring bearing on said face.

4. A fuel distributing valve as in claim 3 wherein the end of said sleeve includes a flange extending radially abutting against said end of said cylindrical casing at the open end for being retained by said flange of said cap.

5. A fuel distributing valve as in claim 1 wherein said plurality of elongated slots have different lengths and the beginning thereof is axially spaced so that said annular slot comes in contact with the plurality of slots at different axial positions of its rectilinear travel to sequentially fill said nozzles.

6. A fuel distributing valve as in claim 5 including an additional varying slot in said sleeve communicating with an outlet port for leading fuel back to said fuel control, the size of said additional slot being selected so that the total fuel admitted to said plurality of slots intended to be distributed to said nozzles is distributed so that the quantity of fuel allotted to the slots that are out of full communication with said nozzles flows through said additional slot.

* * * * *